Figure 1:
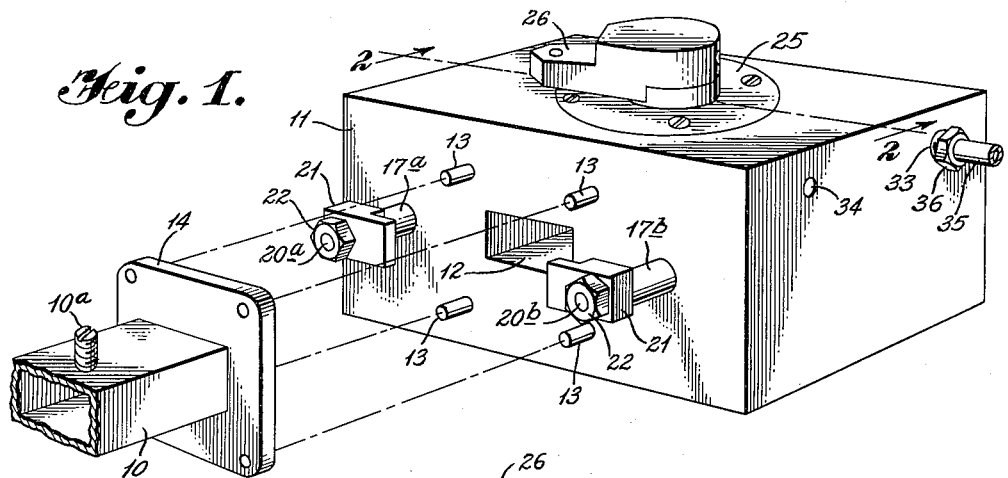

Oct. 24, 1961  W. T. JONES ET AL  3,005,968
CLAMPING DEVICE FOR TESTING WAVE GUIDES
Original Filed Aug. 31, 1956

INVENTORS
William T. Jones
and Thomas L. Gray, Jr.
BY Stevens, Davis, Miller & Mosher
ATTORNEYS

United States Patent Office

3,005,968
Patented Oct. 24, 1961

3,005,968
CLAMPING DEVICE FOR TESTING
WAVE GUIDES
William T. Jones and Thomas L. Gray, Jr., Dallas, Tex., assignors to Texas Instruments Company, Dallas, Tex., a corporation of Delaware
Continuation of abandoned application Ser. No. 607,315, Aug. 31, 1956. This application July 10, 1958, Ser. No. 748,564
2 Claims. (Cl. 333—98)

This invention relates to wave guide testing and more specifically to a device adapted to clamp quick detachably a wave guide to testing apparatus.

This is a continuation of our application entitled Clamping Device for Testing Wave Guides, filed August 31, 1956, Serial No. 607,315, and now abandonded.

In the art of wave guide testing as known, a wave guide section to be tested is attached to a calibrated wave guide section, tested, detached, adjusted, attached again and tested. Each section is provided with a tuning slug so that it can be adjusted to the proper frequency. Each section has a flange at each end so that successive sections can be attached together by means of nuts, bolts, and washers in a conventional manner. In testing a wave guide section, a predominant amount of the time is spent in bolting together two sections and unbolting them. The actual testing takes very little time. The total time presently required to bolt together two sections, tighten down, test, unbolt the sections and adjust the tuning slug, consumes on the average 13 minutes from start to finish.

It would certainly be desirable, in view of the fact that the actual testing time is quite short, to have a mechanism which would tightly and securely and quick detachably clamp a wave guide to a testing apparatus that would simulate a second wave guide section. Accordingly, it is an object of the present invention to provide a clamping device for a wave guide which will speedily, simply and efficiently clamp a wave guide to a testing apparatus, and which will unclamp the wave guide with equal speed and ease. In fact, with this device, the entire operation of clamping, testing, unclamping and adjusting the tuning slug, can be reduced to as little as 33 seconds.

The device of the invention consists of a housing in which a rectangular passage is provided. Studs project from one face of the housing and are adapted to fit into bolt holes defined by the flange of a wave guide section to be tested. This enables the wave guide to be positioned flush against the face of the housing from which the studs project with the wave guide or transmission channel in registry with the passage in the housing. Clamps, which are employed to hold the wave guide section against the housing, and in registry with its passage, are connected to the ends of piston rods which are slidably mounted in chambers located inside the housing of the wave guide testing device. A two-position valve is provided including a value element which defines several passages. A compressed air source is connected via an inlet to the valve and piston chambers. When the valve is in one position, compressed air can pass to the piston chambers and when in its other position, the chambers are connected to an exhaust outlet. This permits compressed air to fill the chambers and drive the piston rods to move the clamps into a tight clamping relation with the wave guide and the housing, and to be exhausted from the chambers to release the pistons so that the wave guide may then be detached and removed from the tester.

Further details and advantages of the clamping device for testing wave guides will be apparent from a consideration of the following detailed description when taken in conjunction with the appended drawing which illustrates a preferred form of this invention. It is to be understood, however, that many modifications and changes in detail may be made within the scope of this invention and that the illustration given hereinafter is simply for the purposes of illustration and not limitation. It will be especially evident that although pneumatic means are shown to operate the piston rod driven clamps, any other suitable drive means may be employed to move the piston rods. Moreover, the number of clamps need not be restricted to two as is shown in the preferred from of this invention but may be any suitable number.

Figure 2:
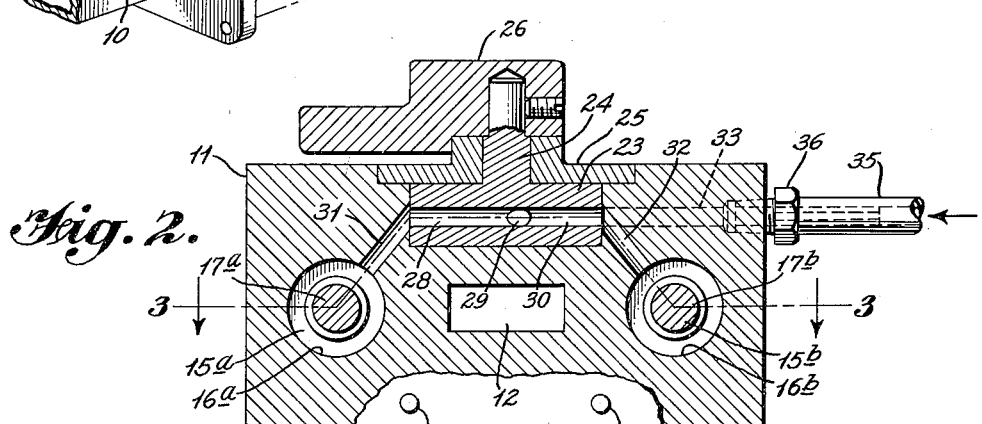
Figure 3:
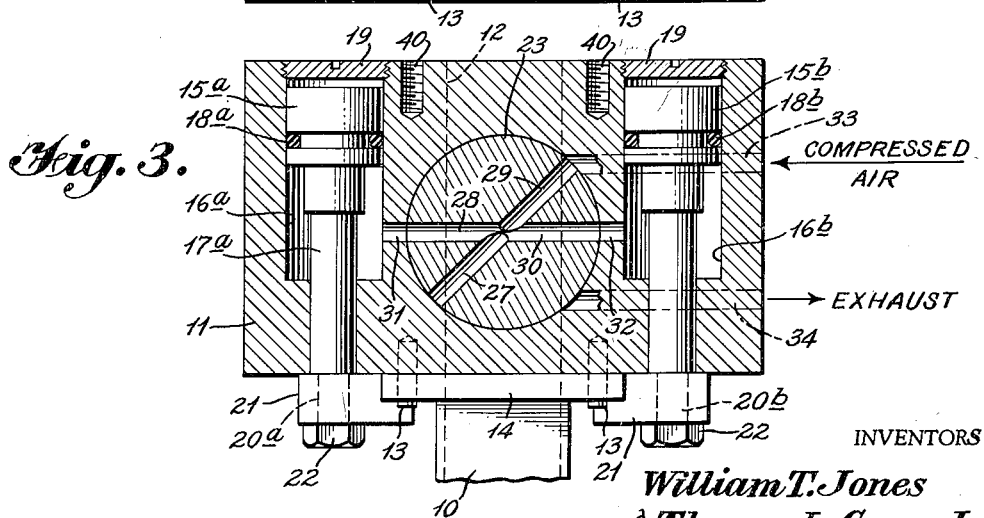

In the appended drawing:
FIGURE 1 is a perspective view of the clamping device of the present invention in which a wave guide is shown aligned with the mounting studs of the tester housing but spaced apart therefrom;
FIGURE 2 is a sectional view taken on line 2—2 of FIGURE 1; and
FIGURE 3 is a sectional view taken on line 3—3 of FIGURE 1.

Referring now to the drawing, a wave guide 10 is adapted to be mounted to a housing 11 for test purposes. A rectangular passage 12 in the housing 11 is to be aligned with the rectangular passage of the wave guide 10 when the wave guide 10 is mounted on the housing 11. Four studs 13, which are mounted on and project from the front face of the housing 11, are adapted to fit into four bolt holes in the corners of the flange portion 14 of the wave guide 10. The studs 13 serve to align the rectangular passage or transmission channel defined by the wave guide 10 with the rectangular passage 12 defined in housing 11. The rear face of the housing 11 is provided with threaded holes 40 (FIGURE 3) to receive bolts for coupling a source of radio frequency energy to the housing 11 to propagate energy into the rectangular passage 12.

Chambers 16a and 16b are defined inside the housing 11 within which pistons 15a and 15b are slidably mounted on drive rods 17a and 17b respectively. O-rings 18a and 18b are mounted in grooves in the pistons 15a and 15b respectively and function as sealing means. Threaded caps 19 are screwed into threaded rear end portions of the chambers 16a and 16b and form a tightly sealed back wall for the chambers 16a and 16b which may be removed if necessary in order to mount or service the pistons 18a and 18b and their related parts. The front end portions 20a and 20b of piston rods 17a and 17b respectively project through the front wall of housing 11 and are of reduced section. The extreme ends are threaded and clamps 21 are mounted thereon by means of nuts 22. The distance that the piston rods 17a and 17b project through the front wall of housing 11 is sufficient to permit the vertical insertion of the flange 14 of the wave guide 10 into the space between the outer ends of studs 13 and the inner flat surface of the clamps 21.

A substantially cylindrical valve element 23 having a stem portion 24, is mounted inside the housing 11 above the passage 12 with the stem portion 24 of the valve element 23 rotatably supported inside a bushing 25 attached to the top of housing 11. A lever 26 forms an extended radially projecting portion of the valve element 23. Rotating the lever 26 causes rotation of the stem 24 inside the bushing 25, thus turning the lower cylindrical portion of the valve element 23.

Passages 27, 28, 29 and 30 are defined by the valve element 23 with all passages radiating from a common point at the center of the valve element 23 and each spaced at an angle of approximately 45° and 135° from adjacent passages. A passage 31 defined by housing 11 communicates the chamber 16a with the valve element 23. Rotation of valve element 23 enables either of the passages 27 or 28 to be placed in registry with passage 31. Similarly, a passage 32 is defined by housing 11 which communicates the chamber 16b with the valve element 23. Rotation of element 23 enables either of the passages 29 or 30 to be placed in registry with passage 32. In addition, an air intake passage 33 is defined by the housing 11 communicating the exterior with passage 29 for one position of valve element 23. Also, an air exhaust passage 34 is defined by housing 11 communicating passage 30 with the exterior for one position of valve element 23.

As shown in FIGURE 3, the valve 23 is positioned with the passage 31 in registry with the passage 28, the passage 32 in registry with the passage 30, and the air input passage 33 in registry with passage 29. With the valve 23 in this position, the air exhaust passage 34 is blocked by the peripheral surface of the valve element 23 and passage 27 is blocked by the housing 11. A pipe 35 leading from a source of compressed air (not shown) is attached by means of threaded plug 36 to the opening in the side face of the housing 11 corresponding with passage 32.

The operation of the clamping device is as follows:

With the pipe 35 connected to a source of compressed air, the lever 26 is moved so that the valve element 23 assumes a position with the passage 33 blocked off and passage 30 in registry with passage 34. The clamps 21 are then manually pulled away from the front face of the housing 11 moving the pistons 15a and 15b toward the front face of the chambers 16a and 16b. Next, the wave guide 10 to be tested is mounted on the front face of the housing 11 by vertically sliding the plate 14 of the wave guide 10 into the space between the clamps 21 and the studs 13 of the housing 11. When the studs 13 are aligned with the holes in the plate 14 the wave guide 10 is pushed horizontally toward the housing 11. The studs 13 fit into the holes in the plate 14.

The wave guide 10 is now tightly clamped to the housing 11 by turning the lever 26 to block off passage 34 and places passages 29 and 33 in registry (this is the position shown in FIGURE 3). Compressed air enters through passage 33, passage 29, and then branches into passages 28 and 30 so that some of the air travels through passages 28 and 31 into chamber 16a and the remaining air from passage 29 tranverses passages 30 and 32 into chamber 16b. As the pressure builds in the chambers 16a and 16b, the pistons 15a and 15b are forced to the rear of the chambers carrying with them the rods 17a and 17b. This action results in the clamps 21 firmly pressing the plate 14 of the wave guide 10 against the front face of the housing 11. The wave guide 10 is now securely held in registry with the passage 12 of the housing 11 and may now be tested. A tuning plug 10a in the wave guide may be adjusted to the desired frequency.

When the testing has been completed, and it is desired to release the wave guide, the lever 26 is rotated clockwise so that the valve element 23 assumes its original position in which passage 27 is in registry with passage 31, passage 30 is in registry with exhaust passage 34, and passage 29 is aligned with passage 32. In this position of the valve 23, valve passage 28 and input passage 33 are blocked. This enables the air in chamber 16a to travel through passages 31, 27, 30, and 34 out of the housing 11 and at the same time the air in chamber 16b to travel through passages 32, 29, 30 and 34, also to the outside. The chambers 16a and 16b now are at atmospheric pressure. The clamps 21 may now be manually pulled away from the front face of the housing 11, and the plate 14 of the wave guide 10 may be removed from the studs 13 and lifted upwardly along the flanges of the clamps 21 to release completely the wave guide 10 from the housing 11.

It will be evident from the above disclosure that the clamping and unclamping operations may be performed quite rapidly, simply and efficiently. All that is required in placing the wave guide on the housing 11 is to mount the guide on the studs and turn the valve lever. The testing may then be done, after which the wave guide can be released by merely turning the valve lever, pulling the clamps 21 away from the housing 11 and removing the wave guide from the studs. The entire operation can be accomplished in as little time as 33 seconds, and the clamping and unclamping of the wave guide to the housing 11 can be done with a minimum of effort.

Although the present invention has been shown and described with reference to a specific embodiment, various changes and modifications, such as those obvious to one skilled in the art are deemed to be within the spirit, scope, and contemplation of the invention.

What is claimed is:

1. The combination comprising wave guide test apparatus including a block characterized by a flat face with at least two pins projecting normally therefrom and defining a through bore extending normally from said flat face, a wave guide to be tested comprised of a guide section provided with tunable plug means and terminating in a flange presenting a flat surface and defining at least two holes, said wave guide being coupled to the wave guide test apparatus with the said flat surfaces in intimate contact, the guide section and the through bore of said block in registry and the said pins received through the holes defined by said flange, and means for coupling a propagation source of radio frequency energy to said block to propagate energy into the end of the through bore defined by said block remote from the flat face of said block, said block further defining a pair of cylinder chambers parallel to and on either side of the through bore, a piston received in each said chamber with its piston rod projecting out of said block normally from said flat face, said block further defining a compressed air inlet channel, an exhaust outlet channel and a pair of cylinder channels each communicating with one of said cylinders, a disc defining intersecting through bores positioned in said block for rotary movement relative thereto, a handle attached to said disc for rotating same, said disc adapted to be rotated to a first position whereat the intersecting bores of said disc place said compressed air inlet channel in communication with said cylinder channels to admit compressed air to said cylinder channels to move said pistons to the end of said chambers remote from said flat face, and to a second position whereat the intersecting bores of said disc place said exhaust outlet channel in commuication with said cylinder channels to relieve the pressure from said pistons, and clamping lugs mounted on the ends of said piston rods and overlying the wave guide flange, said pistons when relieved of pressure arranged to extend said clamping lugs a sufficient distance beyond said pins to allow removal and insertion of said wave guide flange between said lugs and said pins.

2. The combination comprising wave guide test apparatus including a block characterized by a flat face with at least two pins projecting normally therefrom and defining a through bore extending normally from said flat face, a wave guide to be tested comprised of a guide section provided with tunable plug means and terminating in a flange presenting a flat surface and defining at least two holes, said wave guide being coupled to the wave guide test apparatus with the said flat surfaces in intimate contact, the guide section and the through bore of said block in registry and the said pins received through the holes defined by said flange, and means for coupling a propagation source of radio frequency energy to said block to propagate energy into the end of the through bore defined by said block remote from the flat face of said block, said block further defining a pair of cylinder chambers parallel to and on either side of the through bore, a piston received in each said chamber with its piston rod projecting out of said block normally from said flat face, said block further defining a compressed air inlet channel, an exhaust outlet channel and a pair of cylinder channels each communicating with one of said cylinders, valve means cooperating with said block, said valve means in a first position placing said compressed air inlet channels in communication with said cylinder channels to admit compressed air to said cylinder channels to move said pistons to the end of said chambers remote from said flat face, and in a second position placing said exhaust outlet channel in communication with said cylinder channels to relieve the pressure from said pistons, and clamping lugs mounted on the ends of said piston rods and overlying the wave guide flange, said pistons when relieved of pressure arranged to extend said clamping lugs a sufficient distance beyond said pins to allow removal and insertion of said wave guide flange between said lugs and said pins.

References Cited in the file of this patent

UNITED STATES PATENTS

| | | |
|---|---|---|
| 1,333,589 | Nickerson | Mar. 9, 1920 |
| 1,412,170 | Dixon | Apr. 11, 1922 |
| 1,875,486 | Peaslee | Sept. 6, 1932 |
| 2,193,840 | Oberhoffken | Mar. 19, 1940 |
| 2,476,621 | Okress | July 19, 1949 |
| 2,536,602 | Goett | Jan. 2, 1951 |